(12) United States Patent
Berger et al.

(10) Patent No.: US 8,156,792 B2
(45) Date of Patent: Apr. 17, 2012

(54) METHOD AND APPARATUS FOR ASCERTAINING AND/OR MONITORING A PROCESS VARIABLE

(75) Inventors: Andreas Berger, Therwil (CH); Frank Wandeler, Baden-Dattwil (CH); Achim Wiest, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 694 days.

(21) Appl. No.: 11/920,853

(22) PCT Filed: May 8, 2006

(86) PCT No.: PCT/EP2006/062131
§ 371 (c)(1),
(2), (4) Date: Mar. 12, 2009

(87) PCT Pub. No.: WO2006/125722
PCT Pub. Date: Nov. 30, 2006

(65) Prior Publication Data
US 2009/0211347 A1  Aug. 27, 2009

(30) Foreign Application Priority Data

May 23, 2005 (DE) .......................... 10 2005 024 134

(51) Int. Cl.
*G01N 9/24* (2006.01)
*H04B 15/00* (2006.01)
(52) U.S. Cl. ...................................... 73/64.53; 702/189
(58) Field of Classification Search ................ 73/64, 53, 73/1.82, 290 R, 290 V, 502, 629, 632, 861.25, 73/861.27; 702/39, 103, 189
See application file for complete search history.

(56) References Cited

U.S. PATENT DOCUMENTS

| | | | | |
|---|---|---|---|---|
| 3,520,186 A | * | 7/1970 | Adams et al. | ............... 73/290 R |
| 5,883,309 A | | 3/1999 | Vossiek | |
| 6,397,656 B1 | * | 6/2002 | Yamaguchi et al. | ........... 73/1.82 |
| 6,658,944 B2 | * | 12/2003 | Melnikov et al. | .......... 73/861.04 |
| 7,117,134 B2 | * | 10/2006 | Dubois et al. | ..................... 703/5 |
| 7,236,912 B2 | * | 6/2007 | Froehlich et al. | ............. 702/189 |
| 7,245,059 B2 | * | 7/2007 | Lagergren et al. | ............ 310/317 |
| 7,412,902 B2 | * | 8/2008 | Wiest et al. | ................ 73/861.25 |
| 7,523,677 B2 | * | 4/2009 | Wiest et al. | ................ 73/861.27 |

(Continued)

FOREIGN PATENT DOCUMENTS

DE  694 16 129 T2  7/1997

(Continued)

*Primary Examiner* — J M Saint Surin
(74) *Attorney, Agent, or Firm* — Bacon & Thomas, PLLC

(57) ABSTRACT

A method for ascertaining and/or monitoring a process variable, wherein a time-limited, exciting signal, which is described by at least one desired quantity, or by a desired signal form, is applied to a first piezoelectric element, or to a first polarized zone of a piezoelectric element. The response signal, which is described by at least one actual quantity, or actual signal form, corresponding, respectively, to the desired quantity, or desired signal form, is registered by a second piezoelectric element, or by a second polarized zone of the piezoelectric element, wherein the actual quantity, or the actual signal form, of the response signal and the desired quantity, or the designed signal form, of the response signal are compared with one another. On the basis of the ultrasonic measuring signal, which is describable by the defined desired quantity, or the defined, desired signal form, the process variable is ascertained via a sound-entrainment method or via an echo method.

12 Claims, 8 Drawing Sheets

U.S. PATENT DOCUMENTS 7,706,986 B2 * 4/2010 Frohlich et al. .................. 702/48
7,926,344 B1 * 4/2011 Hyde et al. .................. 73/290 V

FOREIGN PATENT DOCUMENTS

| | | |
|---|---|---|
| DE | 196 25 667 | 1/1998 |
| DE | 197 14 973 A1 | 10/1998 |
| DE | 101 18 934 A1 | 10/2002 |
| DE | 103 23 063 A1 | 12/2004 |
| DE | 10 2004 018 507 A1 | 11/2005 |
| DE | 102004018507 | 11/2005 |
| EP | 0 706 835 B1 | 4/1996 |
| EP | 0 706 853 B1 | 4/1996 |
| EP | 1 182 452 A2 | 2/2002 |
| JP | 03118780 * | 5/1991 |
| RU | 2 082 951 | 6/1997 |
| WO | WO 2004/046657 | 6/2004 |

* cited by examiner

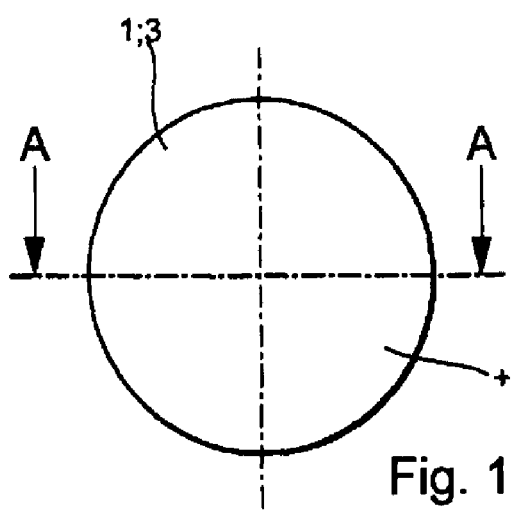
Fig. 1
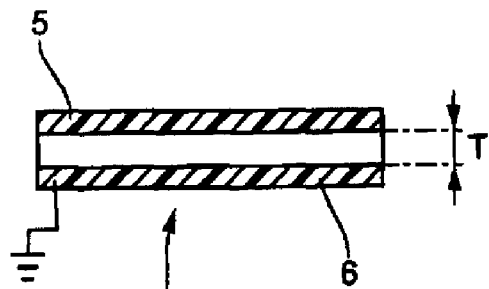
Fig. 1a (Stand der Technik)

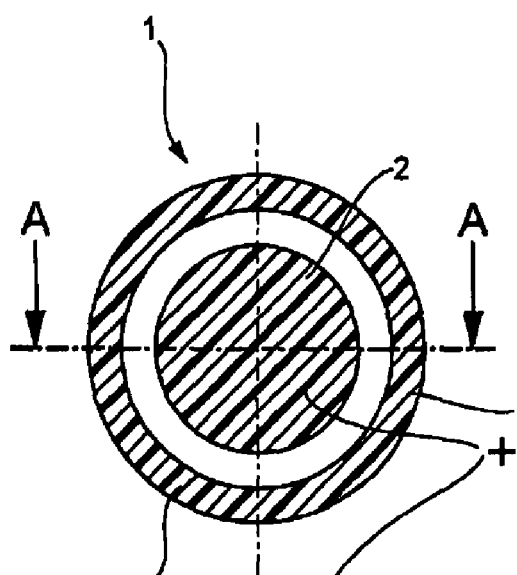
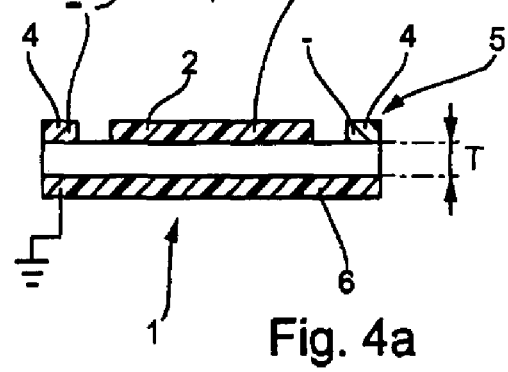
Fig. 4
Fig. 4a

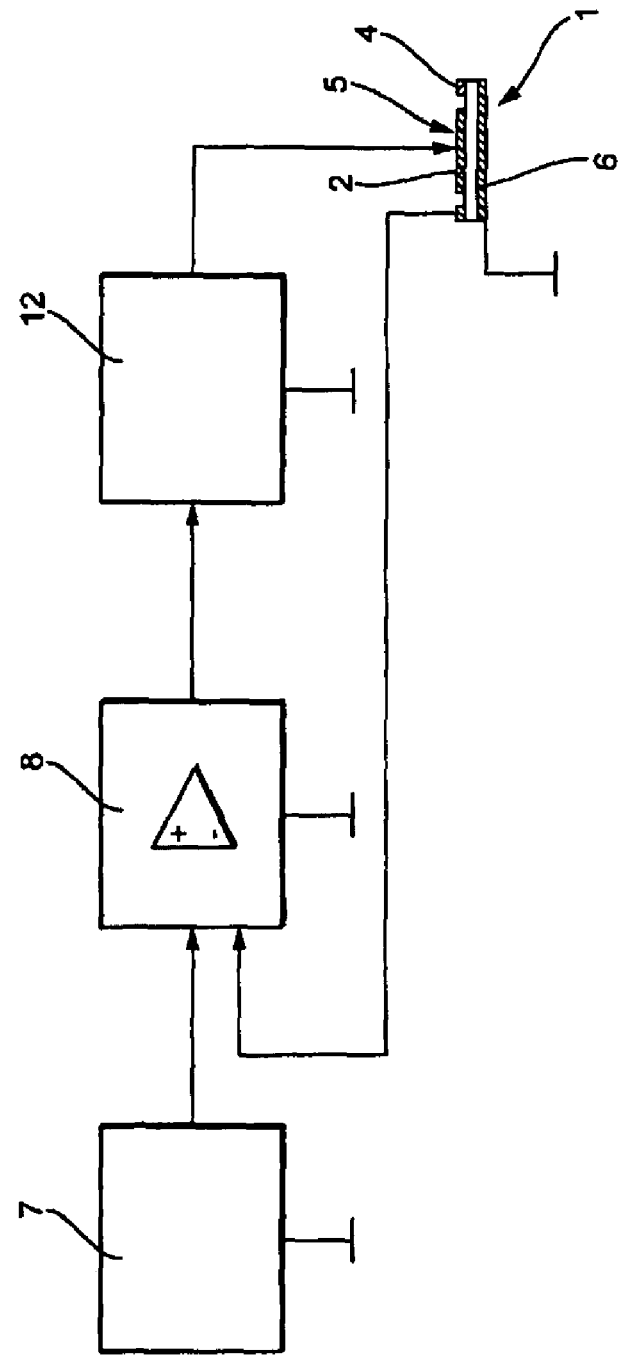

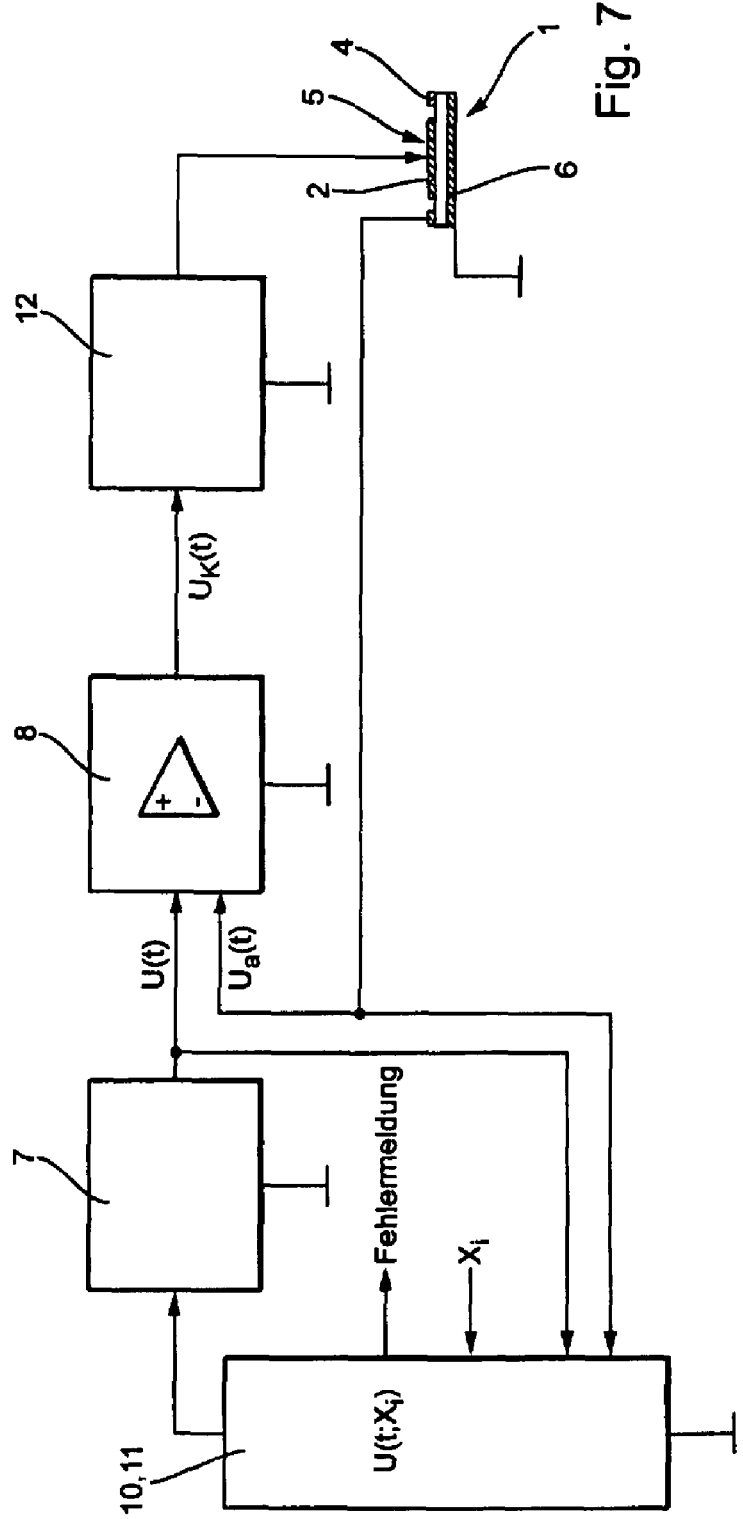

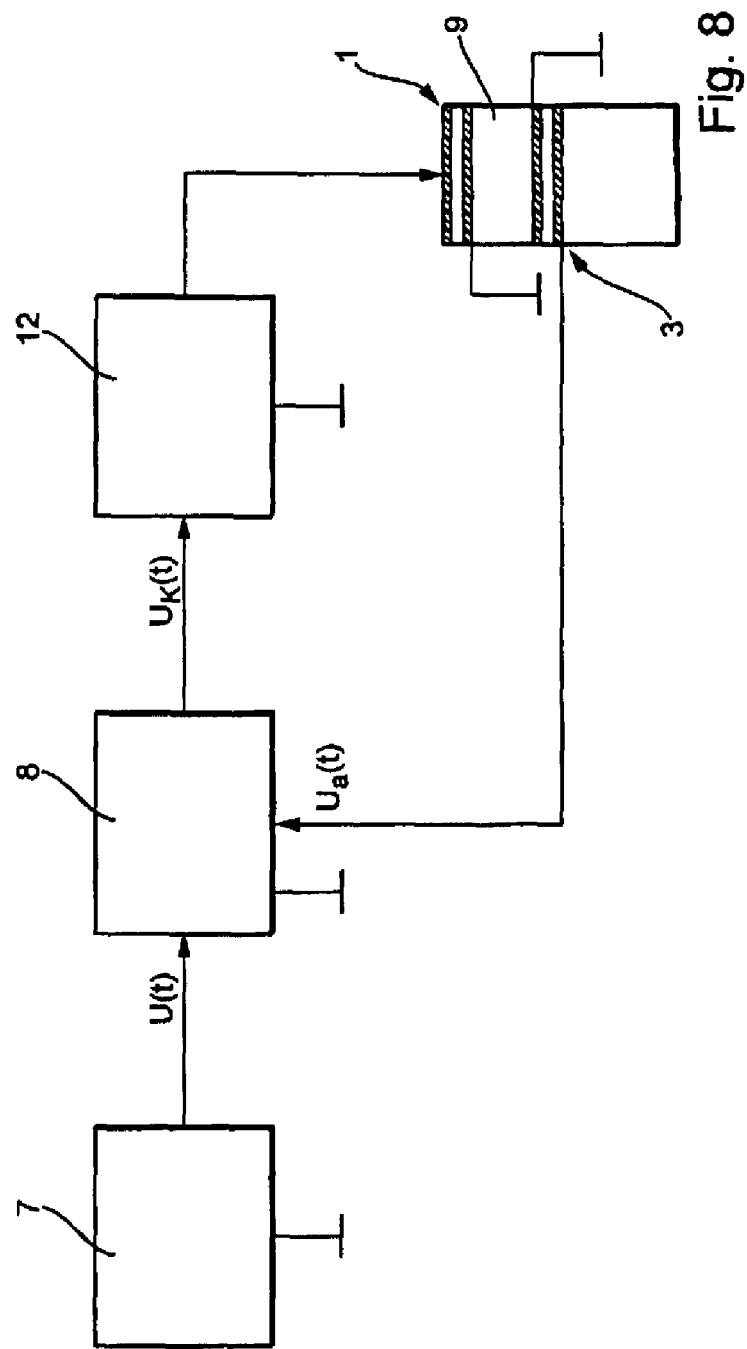

METHOD AND APPARATUS FOR ASCERTAINING AND/OR MONITORING A PROCESS VARIABLE

TECHNICAL FIELD

The invention relates to a method for ascertaining and/or monitoring a process variable.

BACKGROUND DISCUSSION

The process variable is preferably volume- or mass-flow, e.g. flow rate, of a medium through a pipeline or canal. Corresponding ultrasonic flow measuring devices are offered and sold by Endress+Hauser. Furthermore, the process variable can also be the fill level of a fill substance in a container, as measured by means of an ultrasonic travel time method. In general, the method of the invention is applicable for all measuring devices in which ultrasonic measuring signals are transmitted and received.

Without intending to be limited thereto, in the following, reference will be to an ultrasonic flow measuring device. An inline ultrasonic flow measuring device is usually integrated into a pipeline in which a medium to be measured is flowing. Ultrasonic flow measuring devices working according to the travel-time difference method include at least one pair of ultrasonic sensors, which transmit and/or receive ultrasonic measuring signals along defined sound paths. A control/evaluation unit ascertains the volume- and/or mass-flow of the measured medium in the pipeline on the basis of the difference of the travel times of the measuring signals in the flow direction of the measured medium and opposite to the flow direction of the measured medium. The measured medium can be a gaseous or a liquid medium.

Besides the above-described, inline ultrasonic flow measuring devices, also clamp-on flow measuring devices are used, which are mounted externally on the pipeline and measure volume- or mass-flow by transmitting sound through the pipe wall.

Ultrasonic flow measuring devices of the above described kind, which ascertain volume- or mass-flow, are applied often in process and automation technology. Clamp-on flow measuring devices have the advantage that volume- or mass-flow can be ascertained in a containment, e.g. in a pipeline, without contact with the medium. Clamp-on flow measuring devices are described, for example, in EP 0 686 255 B1, U.S. Pat. No. 4,484,478, DE 43 35 369 C1, DE 298 03 911 U1, DE 4336370 C1 or U.S. Pat. No. 4,598,593.

In the case of both types of ultrasonic flow measuring devices, the ultrasonic measuring signals are radiated at a predetermined angle, into, respectively out of, the pipeline. In these measuring devices, the respective positions of the ultrasonic transducers on the measuring tube (inline), or on the pipeline (clamp-on), depend on the inner diameter of the measuring tube and the velocity of sound in the measured medium. In the case of a clamp-on flow measuring device, additionally the application parameters wall thickness of the pipeline and velocity of sound in the material of the pipeline must be taken into consideration.

Usually, in the case of both types of ultrasonic flow measuring devices, the ultrasonic sensors are so arranged that the traversing sound paths are directed through the central region of the pipeline or measuring tube. The ascertained measured-value for the flow reflects, thus, the average flow of the measured medium. In many applications, especially in the case of flow measurements in pipelines of large nominal diameter, this averaging is, however, too inexact. Therefore, it has also become known to provide a plurality of sensor pairs distributed over the periphery of the measuring tube or pipeline, so that flow information is available for various segmented, angular regions of the measuring tube or pipeline.

The essential component of an ultrasonic sensor is a piezoelectric element. The essential component of a piezoelectric element is a piezoceramic layer, in the form of a film, membrane or diaphragm. The piezoceramic is metallized at least in a portion of a region. By application of an electrical, exciting signal, the piezoelectric layer is caused to oscillate. An ultrasonic sensor would function ideally, if the piezoelectric element would exactly follow the electrical, exciting signal—this is, however, not the case in the real world. Rather, the exciting signal usually also excites harmonics and resonances, which are superimposed on the wanted signal and change its signal-, or wave-, form. In this way, the accuracy of measurement of a measuring method based on the piezoelectric effect can be significantly limited.

SUMMARY OF THE INVENTION

An object of the invention is to provide a method with which an optimized signal/noise ratio is achieved in the case of an ultrasonic sensor.

The object is achieved by a method including the following method steps:
- a time-limited, exciting signal, which is described by at least one desired quantity, or by a desired signal form, is fed to a first piezoelectric element or to a first polarized zone of a piezoelectric element;
- a response signal, which is described by at least one actual quantity, or actual signal form, corresponding to the desired quantity or to the desired signal form, is registered by a second piezoelectric element or by a second polarized zone of the piezoelectric element;
- the actual quantity, or the actual signal form, of the response signal and the desired quantity, or the desired signal form, of the response signal are compared with one another;
- in the case of a deviation of the actual quantity, or actual signal form, of the response signal from the desired quantity, or desired signal form, of the response signal, the exciting signal is so modified that the actual quantity, or the actual signal form, of the measuring signal transmitted from the first piezoelectric element, or from the first zone of the piezoelectric element, is at least approximately equal to the desired quantity, or the desired signal form, of the response signal;
- on the basis of the measuring signal, which is describable by the defined, desired quantity, or the defined, desired signal form, the process variable is ascertained via a sound-entrainment method or via an echo method.

A sound entrainment method is one wherein sound is caused to propagate through the medium for performing, for example, a travel-time difference method, a Doppler method, a tag cross correlation method, etc., for example, for measuring flow velocity, or volume- or mass-flow. An echo method is, for example, one wherein sound is caused to propagate to an upper surface and/or to a lower interface, for example, for measuring fill level.

The method of the invention makes use of feedback, either in real time or shifted in time, of the deflection of the piezoelectric element onto the electrical exciting signal. As already mentioned, an ultrasonic measuring signal is produced by application of piezoelectric elements or of piezoelectric films, membranes or diaphragms. Known piezoceramic elements are polarized and are composed usually of a disk metallized on both sides. The deflection of the surface is achieved by application of an electrical voltage between the two metallized surfaces. Receipt of an ultrasonic measuring signal occurs via reversal of the above-described process. This is possible, since the process is reversible.

In an advantageous further development of the method of the invention, it is provided that the exciting signal described by the predetermined desired quantity, or the desired signal form, is produced, the exciting signal is fed to a first polarized zone of the piezoelectric element, the response signal described by the at least one actual quantity, or by the actual signal form, is tapped in a second polarized zone of the piezoelectric element, and that, in case of a deviation of the actual quantity, or actual signal form, of the response signal from the desired quantity, or the desired signal form, of the response signal, the exciting signal is so modified that the response signal is described at least approximately by the predetermined desired quantity, or the predetermined desired signal form. The method is implemented in the simplest case by feedback.

In order to measure the deflection of the piezoelectric element by an applied voltage signal, in a first form of embodiment of the invention, at least one additional metallized and polarized zone is provided on the piezoelement. On this additional, second polarized zone, the voltage is measured, which is dependent on the deflection of the piezoelement. By a linearizing based on a reference measurement of the applied voltage signal relative to the deflection and based on a phase compensation of the delay of the mechanical and electrical components participating in the oscillation, the piezoelectric element can be fitted, as regards its oscillatory behavior, optimally to the desired signal form. Preferably, end stage and the compensation circuit are analog, for the sake of simplicity.

Moreover, in an alternative form of embodiment, the exciting voltage described by the predetermined desired quantity, or desired signal form, is fed to the first piezoelectric element; the response signal described by an actual quantity, or actual signal form, corresponding to the desired quantity, or to the desired signal form, is then tapped at the second piezoelectric element, which is spatially separated from the first piezoelectric element; in the case of a deviation of the actual quantity, or actual signal form, of the response signal from the desired quantity, or desired signal form, of the response signal, the exciting signal is then so modified that the response signal can be described, at least approximately, by the predetermined desired quantity, or desired signal form.

In this second, alternative form of embodiment of the method of the invention, thus a second piezoelectric element is used, which is arranged in the sound path of the first piezoelectric element. This second piezoelectric element has a control function and measures the signal form transmitted from the first piezoelectric element. On the basis of the measured signal form, the ultrasonic measuring signal is so modified that the first piezoelectric element transmits the desired signal form. The second piezoelectric element is thus applied for the direct compensation, or canceling, of undesired harmonics of the ultrasonic measuring signal.

In certain applications, the case can arise, wherein the phase difference from the travel time of the ultrasonic measuring signal between the first piezoelectric element and the second piezoelectric element, which has the function of a control piezoelement, becomes too great, so that a direct feedback is not possible. In this case, the setting of the desired signal form is accomplished by means of an alternative method, which likewise enables suitable canceling of harmonics and resonances of the transmitted ultrasonic measuring signal. To this end, the ultrasonic measuring signal transmitted from the first piezoelectric element is likewise measured by a second piezoelectric element having a control function. The signal form, or some other characteristic quantity of the measured ultrasonic measuring signal is compared with a desired signal form, or desired quantity. From the difference of the two measuring signals, a new exciting signal is generated and stored. For the next exciting of the piezoelectric element, this newly generated and stored exciting signal is used. The transmitted ultrasonic measuring signal is measured again, compared with the desired exciting signal and, from the difference, in turn, a modified exciting signal is generated and stored. By iterative application of the method, the actual signal form of the current ultrasonic measuring signal successively gets closer to the desired signal form of the ultrasonic measuring signal.

A further development for the two above-described variants of the method of the invention provides that the actual quantity, or the actual signal form, of the response signal is modified by changing the voltage applied to the first zone of the piezoelectric element or by changing the voltage applied to the first piezoelectric element.

Furthermore, as already mentioned above, it is provided that the desired voltage of the response signal is compared with the actual voltage of the response signal and a deviation between the two voltages is corrected via a difference amplification.

An advantageous embodiment of the method of the invention provides, moreover, that the desired signal form of the response signal is ascertained and stored, in each case as a function of the conditions reigning in the process and/or system, as signal form of the exciting signal, and that the signal form tuned for the, in each case, reigning process and/or system conditions is applied as exciting signal for the at least one zone of the piezoelectric element or as exciting signal for the first piezoelectric element.

Furthermore, it is provided that the signal form ascertained under certain process and/or system conditions is fed as exciting signal to the first piezoelectric element and that, in the case of a deviation of the signal form of the second piezoelectric element from the signal form of the exciting signal stored as a function of process and/or system conditions, an error report is generated. A deviation from a correction of the ultrasonic measuring signal ascertained earlier under predetermined conditions is thus used here for error recognition.

As already mentioned above, the piezoelectric element is a disc-shaped element, which has two oppositely lying, end faces. The piezoelectric element is a film, membrane or diaphragm.

Preferably, the piezoelectric element has different zones with polarization independent of one another; moreover, it is advantageous, when the zones of mutually independent polarization are located on the same end surface of the piezoelectric element. This simplifies wiring in many cases.

An apparatus suited for performing the method of the invention includes a signal generator, which supplies the time-limited exciting signal described by a quantity, or a signal form, to the first polarized zone of the piezoelectric element. Furthermore, a correction circuit is provided, which taps the corresponding actual quantity, or actual signal form, from the second polarized zone of the piezoelectric element and compares such with the desired quantity, or desired signal form, of the response signal; the correction circuit applies to the first polarized zone, in the case of a discrepancy between the desired quantity and the actual quantity, or between the desired signal form and the actual signal form, of the response signal, with a compensating signal, which is so dimensioned, that the actual quantity, or the actual signal form, of the response signal is approximately equal to the desired quantity, or desired signal form, of the response signal.

Instead of the influencing of a piezoelectric element with differently polarized zones, an alternative embodiment of the apparatus includes two piezoelectric elements, which are arranged in the immediate vicinity of, or neighboring, one another. In general, it can be said that the second piezoelectric element is arranged in the sound path of the first piezoelectric element. For avoiding reflections, it is advantageous in this connection that a coupling medium be arranged between the two piezoelectric elements.

If the method is used, involving an iterative fitting of the transmitted ultrasonic measuring signal to an ultrasonic measuring signal having a predetermined, desired signal form, then a memory unit is provided, in which quantities, or signal-forms, of the response signal are stored as a function of conditions reigning in the process and/or system.

In this connection, an option is then to apply the apparatus of the invention for recognizing errors in the system or process. To this end, an evaluating unit is provided, which detects a deviation of an actual quantity, or signal form, of the response signal from the corresponding, desired quantity, or desired signal form, of the response signal recorded under defined process and/or system conditions, and, in such case, generates a corresponding error report.

BRIEF DESCRIPTION OF THE DRAWINGS

The invention will now be explained in greater detail on the basis of the drawing, the figures of which show as follows:

FIG. 1 is a plan view of an end surface of a piezoelectric element known from the state of the art;

FIG. 1a is a cross section taken according to the cutting plane A-A of FIG. 1;

FIG. 4 is a first form of embodiment of a piezoelectric element having two differently polarized zones;

FIG. 4a is a cross section taken according to the cutting plane A-A of FIG. 4;

FIG. 6 is a first circuit arrangement suitable for activating a piezoelectric element having two differently polarized zones;

FIG. 7 is a second circuit arrangement suitable for activating a piezoelectric element having two differently polarized zones;

FIG. 8 is a circuit arrangement for activating a first piezoelectric element, follow which is placed a second piezoelectric element having a compensating, or canceling, function.

DETAILED DESCRIPTION OF THE DRAWINGS

FIG. 1 is a plan view of an end surface 6 of a piezoelectric element 1 known from the state of the art. FIG. 1a shows the piezoelectric element 1 of FIG. 1 in cross section according to the cutting plane A-A of FIG. 1. Such a piezoelectric element 1 is the essential component of an ultrasonic sensor, such as used, for example, for flow measurement or for fill level and distance measurement. The piezoceramic layer forming the piezoelectric element 1 is a film, membrane or diaphragm having a conductive coating applied to both sides. From the state of the art, it is known, for example, to polarize the oppositely lying end surfaces 5, 6 of the piezoelectric element 1 differently. The thickness T of the piezoelectric layer determines the eigenfrequency of the piezoelectric element.

Figure 2:
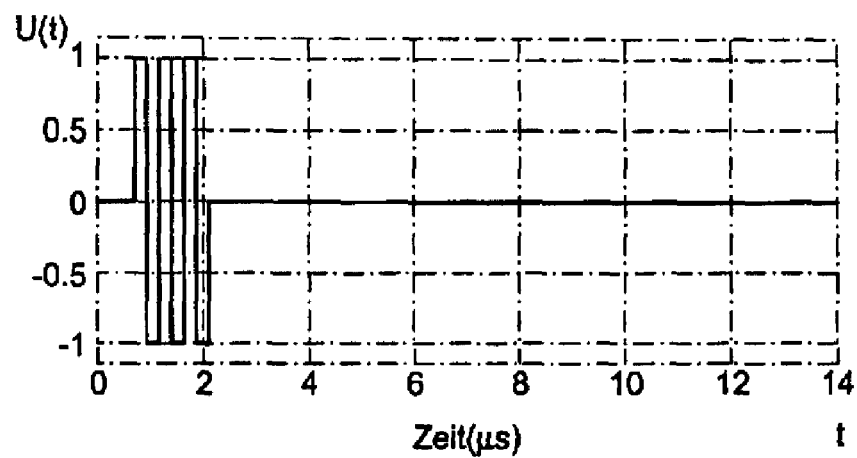
FIG. 2 is a voltage signal as used in the state of the art for exciting a piezoelectric element.

The piezoelectric element 1 is caused to oscillate by means of an electric exciting signal U(t). The functioning of an ultrasonic sensor is to be rated as ideal, when the ultrasonic measuring signal transmitted from the piezoelectric element 1 exactly follows, as regards its signal form, or waveform, the electrical exciting signal U(t); this is, however, most often, not the case in the real world. Rather, usually also harmonics and resonances are excited in addition to the fundamental frequency. These are superimposed on the wanted signal and change its signal form. An example is shown schematically by comparison of FIGS. 2 and 3.

Figure 3:
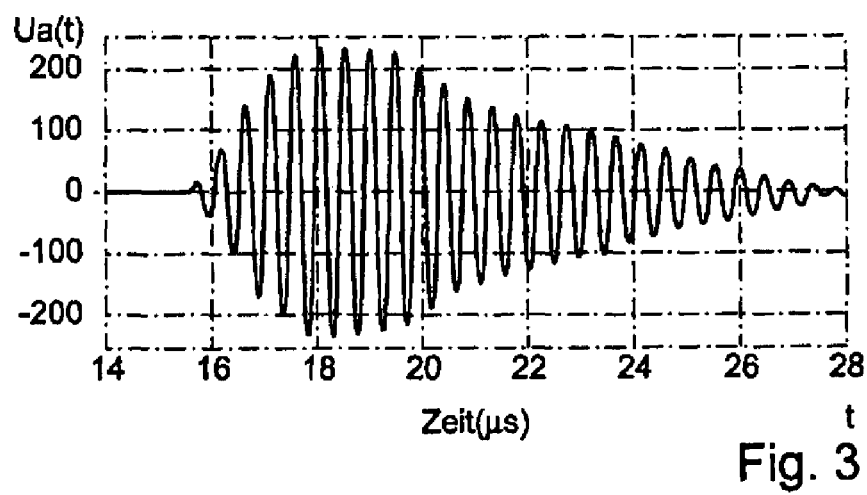
FIG. 3 is a response signal for the voltage signal shown in FIG. 2.

On the basis of the response, or answer, signal $U_a(t)$ shown in FIG. 3, one can see that the response signal $U_a(t)$ has, compared with the exciting signal U(t), a markedly longer decay time. The exciting signal U(t) is produced by the signal generator 7.

It is clear that this change in signal form can lead to significant errors in measurement, when the travel time of the ultrasonic measuring signals is small relative to the measuring signal.

Figure 5:
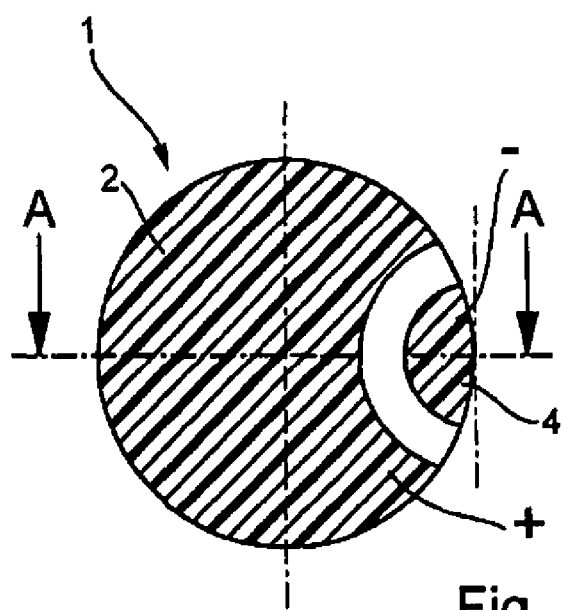
FIG. 5 is a second form of embodiment of a piezoelectric element having two differently polarized zones.
Figure 5A:
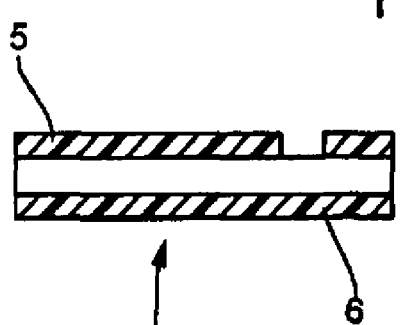
FIG. 5a is a cross section taken according to the cutting plane A-A of FIG. 5.

FIG. 4 shows a first form of embodiment of a piezoelectric element 1 with two differently polarized zones 2, 4. This piezoelectric element 1 is suitable for executing a first variant of the method of the invention. FIG. 5 shows a second form of embodiment of a piezoelectric element 1 suited for executing the method of the invention. FIGS. 4a and 5a show, respectively, the corresponding cross sections taken according to the cutting planes A-A of FIGS. 4 and 5.

In both forms of embodiment, two zones 2, 4 of different polarization are provided on an end surface 5 of the piezoelectric element 1. While the differently polarized zones 2, 4 are concentrically arranged in the form of embodiment shown in FIG. 4, zones 2, 4 of the form of embodiment shown in FIG. 5 are placed asymmetrically. Under the influence of the exciting signal U(t), the first zone 2 transmits a response signal $U_a(t)$, which is received by the second zone 4 of the piezoelectric element 1 in real time.

As shown by the circuit of FIG. 6, the response signal $U_a(t)$ received by the second zone 4 is fed to the correction circuit 8, which is preferably a difference amplifier, and, via the end stage/amplifier 12 back to the first zone 2 of the piezoelectric element 1. Via this feedback circuit, it is achieved, that the response signal $U_a(t)$ in the steady state has, at least approximately, the signal form of the exciting signal U(t).

FIG. 8 shows an analog feedback circuit for activating a first piezoelectric element 1, following which is placed a second piezoelectric element 3 exercising a compensating function. Between the two piezoelectric elements 1,3 is located a coupling medium 9, whose properties are matched to the properties of the two piezoelectric elements 1, 3 as regards e.g. damping and reflectivity. In the case of this embodiment, thus, the second piezoelectric element 3, which is positioned in the sound path of the first piezoelectric element 1, delivers the response signal $U_a(t)$ to the difference amplifier 8.

The circuit arrangement shown in FIG. 7 differs from that shown in FIG. 6 by the additional memory unit 10 and the evaluating unit 11. This circuit arrangement is suitable for execution of a preferred form of embodiment of the method of the invention, in which the approach of the system to steady state is shortened. According to this form of embodiment, the desired signal form of the response signal $U_a(t)$ is ascertained and stored in each case as signal form of the exciting signal $U(t; X_i)$ as a function of the conditions $X_i$ reigning in the process and/or in the system; this signal form, in each case optimally fitted to the reigning process and/or system conditions $X_i$ and already earlier determined, is then used as exciting signal $U(t; X_i)$ for the at least one zone 2 of the piezoelectric element 1 or as exciting signal for the first piezoelectric element 1.

Further, it is provided that the signal form ascertained under certain process and/or system conditions $X_i$ is fed to the first piezoelectric element as exciting signal $U(t; X_i)$ and that, in the case of a deviation of the signal form of the response signal $U_a(t; X_i)$, as delivered from the second piezoelectric element 1, from the signal form of the exciting signal $U(t; X_i)$ stored under defined process and/or system conditions $X_i$, an error report is generated. A discrepancy between the response signal $U_a(t; X_i)$ delivered by the second piezoelectric element 1 or the second zone 3 of the piezoelectric element 1 is thus used for error detection.

Figure 9:
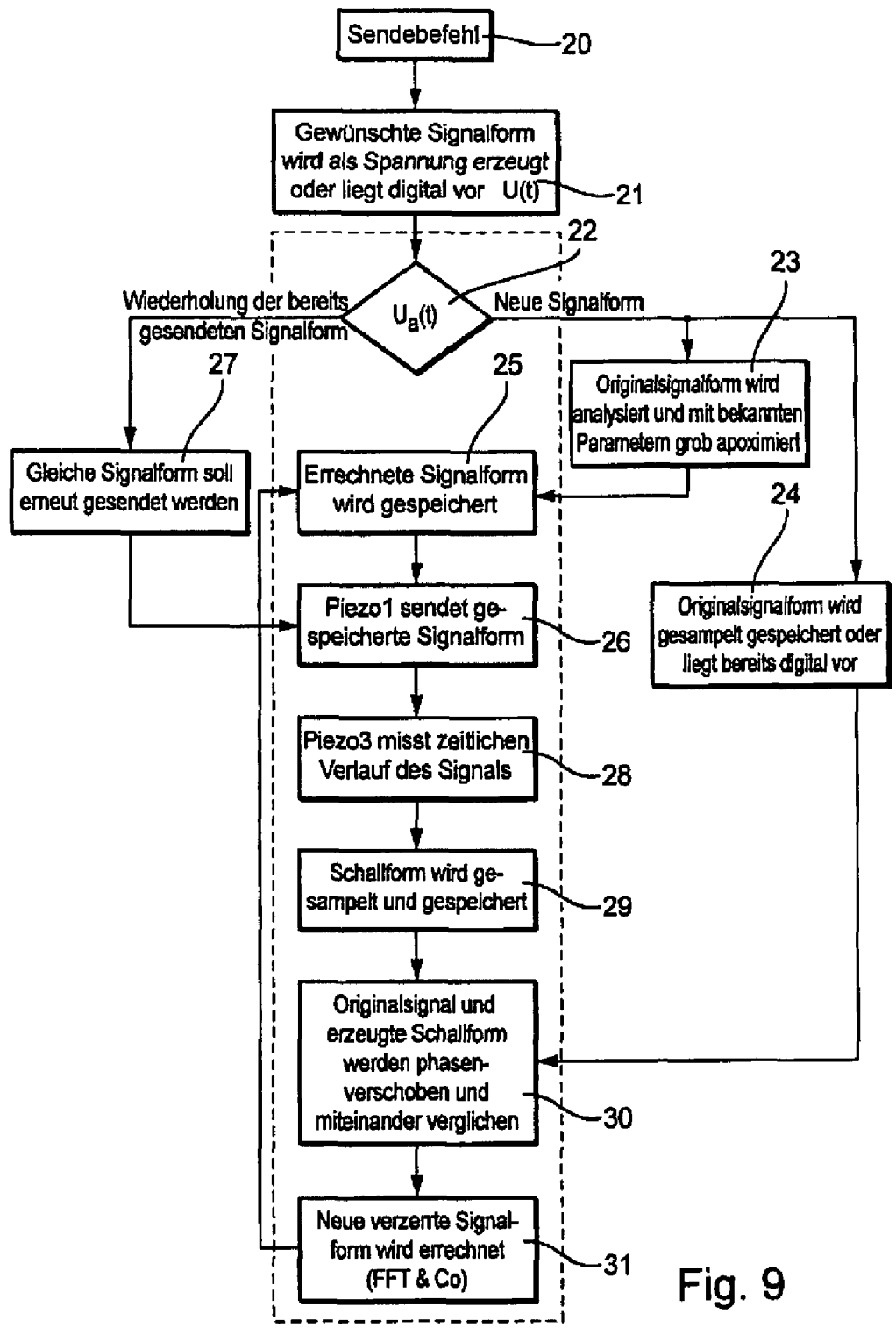
FIG. 9 is a flow diagram for executing a preferred variant of the method of the invention.

FIG. 9 shows a flow diagram for executing a preferred variant of the method of the invention, in which the actual signal form of the exciting signal is iteratively brought closer to the desired signal form. By means of this method, it is possible to perform a damping or impedance measurement, or, in connection with a velocity of sound measurement, a density measurement. Also, by the method as described in the following, it is possible to detect wear or, in general, an error at the piezoelectric element embodied as a transmitter.

In general, in the case of this embodiment, an iterative approach of the signal form of the ultrasonic measuring signal transmitted for ascertaining a process variable to the desired signal form of the exciting signal $U(t)$ is achieved. As soon as the actual signal form of the exciting signal matches the desired signal form, later changes permit conclusions concerning possible system or process errors.

Program start occurs at point 20. At point 21, the desired signal form is generated as voltage signal $U(t)$. In point 22, a decision is reached, whether this desired signal form is already known and corresponds to a stored signal form or whether it must be newly approximated. If the desired signal form is already sufficiently accurately achieved by the actual signal measured in point 28, then the stored signal form is transmitted anew. Otherwise the program goes to points 23 and 24. At point 23, the desired signal form is analyzed and described by suitable parameters. These determined parameters are stored at point 25. Additionally, the desired signal form is sampled, stored, or these data are already digitally stored at the program point 24.

Applied to the first piezoelectric element 1 at point 26 is a voltage signal $U(t)$ having the stored, desired signal form. The first piezoelectric element 1 thus assumes the function of a transmitter. At point 28, the second piezoelectric element 3 measures the actual time behavior of the stored, desired signal form. The second piezoelectric element 3 receives at program point 28 the response signal $U_a(t)$. Thus, the second piezoelectric element has the function of a microphone.

At point 29, the actual signal form of the response signal is sampled and stored. Then, at program point 30, the desired signal form of the exciting signal, sampled and stored at point 24, and the actual signal form of the response signal are phase shifted and compared, or correlated, with one another. The phase shifting is needed, since the response signal is time shifted relative to the exciting signal, due to the travel time between the first piezoelectric element 1 and the second piezoelectric element 3. Via a suitable algorithm, e.g. via an FFT, at point 31 a corrected, desired signal form is determined. This corrected, desired signal form is fed back to the program point 25 and stored. The program points 26 to 31 are successively passed through, until the actual signal form and the desired signal form agree to a sufficient degree of accuracy.

The invention claimed is:

1. A method for ascertaining and/or monitoring a process variable, comprising the steps of:
    feeding a time-limited exciting signal, which is described by at least one desired quantity, or by a desired signal form, to a first piezoelectric element or to a first polarized zone of the first piezoelectric element;
    registering a response signal, which is described by at least one actual quantity, or actual signal form, corresponding to the desired quantity, or desired signal form, by a second piezoelectric element or a second polarized zone of the second piezoelectric element;
    comparing the actual quantity, or the actual signal form, of the response signal and the desired quantity, or desired signal form, of the response signal with one another;
    modifying the exciting signal, in the case of a deviation of the actual quantity, or actual signal form, of the response signal from the desired quantity, or desired signal form, of the response signal that the actual quantity, or actual signal form, of an ultrasonic measuring signal transmitted from the first piezoelectric element, or from the first polarized zone of the first piezoelectric element, is at least approximately equal to the desired quantity, or the desired signal form, of the response signal; and
    ascertaining the process variable on the basis of the ultrasonic measuring signal, which is describable by the defined, desired quantity, or the defined, desired signal form, via a sound-entrainment method or an echo method, wherein:
    the two piezoelectric elements are coupled together via a coupling element; and
    the two piezoelectric elements are arranged adjacent to one another.

2. The method as claimed in claim 1, further comprising the steps of:
    producing the exciting signal described by the predetermined desired quantity, or desired signal form;
    applying the exciting signal to the first polarized zone of the first piezoelectric element;
    tapping the response signal described by the at least one actual quantity, or by the actual signal form, in the second polarized zone of the second piezoelectric element; and
    modifying the exciting signal in case of a deviation of the actual quantity, or actual signal form, of the response signal from the desired quantity, or desired signal form, of the response signal, that the response signal is at least approximately described by the predetermined desired quantity, or the desired signal form.

3. The method as claimed in claim 1, further comprising the steps of:
    applying to the first piezoelectric element the exciting signal described by the predetermined desired quantity, or desired signal form;
    tapping the response signal described by an actual quantity, or actual signal form, corresponding to the desired quantity, or desired signal form, from the second piezoelectric element; and
    modifying the exciting signal in the case of a deviation of the actual quantity, or actual signal form, of the response signal from the desired quantity, or desired signal form, of the response signal, that the response signal is at least approximately described by the predetermined desired quantity, or desired signal form.

4. The method as claimed in claim 1, further comprising the steps of:
modifying the actual quantity, or actual signal form, of the response signal by changing the voltage applied to the first polarized zone of the first piezoelectric element or by changing the voltage applied to the first piezoelectric element.

5. The method as claimed in claim 4, further comprising the steps of:
comparing the desired voltage of the response signal with the actual voltage of the response signal; and
correcting a deviation between the two voltages via a difference amplification.

6. The method as claimed in claim 1, further comprising the steps of:
ascertaining and storing the desired signal form of the response signal as a function of conditions reigning in the process and/or in the system, in each case, as a signal form of the exciting signal; and
applying the signal form matched to the reigning process- and/or system-conditions as the exciting signal for the at least one polarized zone of the first piezoelectric element or as the exciting signal for the first piezoelectric element.

7. The method as claimed in claim 6, further comprising the steps of:
applying the signal form ascertained under determined process- and/or system-conditions as the exciting signal to the first piezoelectric element; and
generating an error report in the case of a deviation of the signal form of the second piezoelectric element from the signal form of the exciting signal stored as a function of process- and/or system conditions.

8. An apparatus for ascertaining and/or monitoring a process variable, comprising:
a first piezoelectric element having a first polarized zone; and
a second piezoelectric element having a second polarized zone; said first piezoelectric element and said second piezoelectric element are embodied in a disk shape and each has two end surfaces lying opposite to one another, wherein:
a time-limited exciting signal, which is described by at least one desired quantity, or by a desired signal form, to said first piezoelectric element or to said first polarized zone of said first piezoelectric element;
a response signal, which is described by at least one actual quantity, or actual signal form, corresponding to the desired quantity, or desired signal form, is registered by said second piezoelectric element or said second polarized zone of said second piezoelectric element;
the actual quantity, or the actual signal form, of the response signal and the desired quantity, or desired signal form, of the response signal are compared with one another;
in the case of a deviation of the actual quantity, or actual signal form, of the response signal from the desired quantity, or desired signal form, of the response signal, the exciting signal is so modified, that the actual quantity, or actual signal form, of the ultrasonic measuring signal transmitted from said first piezoelectric element, or from said first zone of the piezoelectric element, is at least approximately equal to the desired quantity, or the desired signal form, of the response signal, and
on the basis of the ultrasonic measuring signal, which is describable by the defined, desired quantity, or the defined, desired signal form, the process variable is ascertained via a sound-entrainment method or an echo method, wherein:
the two piezoelectric elements are coupled together via a coupling element; and
the two piezoelectric elements are arranged adjacent to one another.

9. The apparatus as claimed in claim 8, wherein:
said first piezoelectric element has, in different zones, polarizations which are independent of one another; and
the zones with the independent polarizations are arranged on the same end surface of said first piezoelectric element.

10. The apparatus as claimed in claim 8, further comprising:
a signal generator, which applies the time-limited, exciting signal, described by a quantity, or a signal form, to the first polarized zone of the piezoelectric element; and
a correction circuit, which taps the corresponding actual quantity, or the corresponding actual signal form, of the response signal from said second polarized zone of said second piezoelectric element and compares such with the desired quantity, or desired signal form, of the response signal; wherein:
said correction circuit, in the case of a difference between the desired quantity and the actual quantity, or between the desired signal form and the actual signal form, of the response signal, applies to said first polarized zone a compensation signal, which is so selected that the actual quantity, or the actual signal form, of the response signal is approximately equal to the desired quantity, or desired signal form, of the response signal.

11. The apparatus as claimed in claim 8, further comprising:
a memory element, in which quantities, or signal forms, of the response signal are stored as a function of conditions reigning in the process and/or system.

12. The apparatus as claimed in claim 8, further comprising:
an evaluating unit, which detects a deviation of an actual quantity, or actual signal form, of the response signal from the corresponding desired quantity, or desired signal form, of the response signal recorded under defined process- and/or system-conditions and generates an error report.

* * * * *